United States Patent
Pan et al.

(10) Patent No.: US 9,241,313 B2
(45) Date of Patent: Jan. 19, 2016

(54) MOBILE PHONE PERFORMING POWER ADJUSTMENT AND POWER ADJUSTMENT METHOD THEREOF

(71) Applicant: Huizhou TCL Mobile Communication Co., Ltd, Huizhou, Guangdong (CN)

(72) Inventors: Lingjian Pan, Guangdong (CN); Zhenhui Yan, Guangdong (CN)

(73) Assignee: Huizhou TCL Mobile Comunication Co., Ltd, Huizhou (CN)

( * ) Notice: Subject to any disclaimer, the term of this patent is extended or adjusted under 35 U.S.C. 154(b) by 0 days.

(21) Appl. No.: 14/363,003

(22) PCT Filed: Dec. 25, 2012

(86) PCT No.: PCT/CN2012/087407
§ 371 (c)(1),
(2) Date: Jun. 5, 2014

(87) PCT Pub. No.: WO2013/113239
PCT Pub. Date: Aug. 8, 2013

(65) Prior Publication Data
US 2014/0342784 A1    Nov. 20, 2014

(30) Foreign Application Priority Data

Feb. 1, 2012   (CN) .......................... 2012 1 0022704

(51) Int. Cl.
| | | |
|---|---|---|
| H04B 1/38 | (2015.01) | |
| H04W 52/02 | (2009.01) | |
| H04W 52/14 | (2009.01) | |
| H04W 52/24 | (2009.01) | |
| H04W 52/28 | (2009.01) | |
| H04W 52/36 | (2009.01) | |

(52) U.S. Cl.
CPC ........ *H04W 52/0254* (2013.01); *H04W 52/146* (2013.01); *H04W 52/247* (2013.01); *H04W 52/283* (2013.01); *H04W 52/367* (2013.01)

(58) Field of Classification Search
None
See application file for complete search history.

(56) References Cited

U.S. PATENT DOCUMENTS

| | | | | |
|---|---|---|---|---|
| 2007/0077901 | A1* | 4/2007 | Jung | 455/127.1 |
| 2009/0305742 | A1* | 12/2009 | Caballero et al. | 455/566 |
| 2011/0124364 | A1* | 5/2011 | Donovan et al. | 455/522 |
| 2012/0077538 | A1* | 3/2012 | Yun | 455/522 |

FOREIGN PATENT DOCUMENTS

| | | |
|---|---|---|
| CN | 101895977 A | 11/2010 |
| CN | 102089989 A | 6/2011 |
| CN | 102595571 A | 7/2012 |
| WO | 2009/096643 A1 | 8/2009 |

* cited by examiner

*Primary Examiner* — German J Viana Di Prisco
(74) *Attorney, Agent, or Firm* — Ladas & Parry LLP

(57) ABSTRACT

The present disclosure discloses a power-adjustable mobile phone and a power adjustment method thereof. The method comprises following steps of: a. determining whether a maximum power transmission instruction from a base station is received before establishing a phone call; b. determining whether an interrupt signal emitted from a range sensor is received after it is determined that the maximum power transmission instruction from the base station is received; c. setting a maximum output power of a radio frequency power amplifier (RFPA) to be a first output power when it is determined that the interrupt signal is not received, and setting the maximum output power of the RFPA to be a second output power when it is determined that the interrupt signal is received; and d. controlling the RFPA to output radio frequency (RF) signals with the maximum output power.

12 Claims, 1 Drawing Sheet

MOBILE PHONE PERFORMING POWER ADJUSTMENT AND POWER ADJUSTMENT METHOD THEREOF

RELATED APPLICATION INFORMATION

This application is a 371 of International Application PCT/CN2012/087407 filed 25 Dec. 2012 entitled "Mobile Phone Performing Power Adjustment And Power Adjustment Method Thereof", which was published on 8 Aug. 2013, with International Publication Number WO 2013/113239A1, and which claims priority from CN Application No. 201210022704.X filed 1 Feb. 2012, the contents of which are incorporated herein by reference.

FIELD OF THE DISCLOSURE

The present disclosure generally relates to the technical field of communication, and more particularly to a power-adjustable mobile phone and a power adjustment method thereof.

BACKGROUND OF THE DISCLOSURE

Various organs of a human body are lossy dielectrics, so that electromagnetic field in human body will generate currents that absorb and dissipate electromagnetic energy. This physical process is usually represented as the specific absorption rate (SAR) in the biological dosimetry.

The SAR refers to the electromagnetic power absorbed or dissipated by per unit mass of human tissues, and has a unit of watts per kilogram (W/Kg).

Mobile phones radiate a great amount of electromagnetic waves to the outside during use, and the mobile phone are generally putted beside his/her ear during a phone call, therefore the long-term use of the mobile phones will cause brain dysfunction and influence human health. Thus, it is necessary for the mobile phones to pass an SAR test before shipment.

Currently the SAR test tests the SAR mainly by disposing the mobile phone at 2 to 3 centimeters away from a human face.

Various data of the current antenna using a GSM850 frequency band will be described with reference to table 1:

TABLE 1

|  | Radiation power of the antenna | Maximum output power of RFPA | DAC value of RFPA | SAR |
|---|---|---|---|---|
| Data | 28.2 dBm | 33 dBm | 580 | 1.2 W/Kg |
| Standard | 28 dBm | 33 ± 2 dBm | <1023 | 1.0 W/Kg |

As shown in table 1, the radiation power of the antenna using the GSM850 frequency band is 28.2 dBm, and the standard value is specified to be higher than 28 dBm. The standard value of the SAR is 1.0 W/Kg, but the SAR of the GSM850 has reached 1.2 W/Kg.

The radiation power of the antenna of a mobile phone is directly related to the SAR. The higher the radiation power of the antenna is, the greater the SAR will be. Therefore, one of the approaches to reduce the SAR is to reduce the radiation power of the antenna. Therefore, the SAR can be reduced by directly reducing the output power of the radio frequency power amplifier (RFPA) so as to reduce the radiation power of the antenna.

However, a resulting problem is that: if the maximum output power of the RFPA is reduced, the radiation power of the antenna will be reduced simultaneously. If the maximum output power of the RFPA is reduced to 32 dBm, then the radiation power of the antenna will be reduced by about 1 dBm simultaneously. Consequently, the radiation power of the antenna cannot meet the standard when it is tested in a free space.

Thus, when the radiation power of the antenna is adjusted to meet the standard, i.e., higher than 28 dBm, during related tests on the mobile phone, the SAR will be found to reach 1.2 W/Kg, which is out of the limit, in the SAR test. In this case, the antenna radiation power test and the SAR test cannot meet the standard simultaneously by directly reducing the output power of the RFPA.

SUMMARY OF THE DISCLOSURE

The main technical problem to be solved by the present disclosure is to provide a power-adjustable mobile phone and a power adjustment method thereof that allow the mobile phone to meet the requirements of the SAR test and the antenna radiation power test simultaneously.

To solve the aforesaid technical problem, one technical solution of the present disclosure is to provide a method for adjusting the power of a mobile phone, and the method comprises the following steps of: a. determining whether a maximum power transmission instruction from a base station is received before establishing a phone call; b. determining whether an interrupt signal emitted by a range sensor is received after it is determined that the maximum power transmission instruction from the base station is received, wherein the range sensor emits the interrupt signal when a distance between the mobile phone and a human face is within a (predetermined distance range of 0 to 3 centimeters; c. setting a maximum output power of a radio frequency power amplifier (RFPA) to be a first output power when it is determined that the interrupt signal is not received, and setting the maximum output power of the RFPA to be a second output power when it is determined that the interrupt signal is received, wherein the first output power is larger than the second output power, the first output power is 33 dBm, and the second output power is 32 dBm; and d. controlling the RFPA to output a radio frequency (RF) signal with the maximum output power.

The step b further comprises: controlling the RFPA to output the RF signal with a power required for a normal phone call after it is determined that the maximum power transmission instruction from the base station is not received.

To solve the aforesaid technical problem, one technical solution of the present disclosure is to provide a method for adjusting the power of a mobile phone, and the method comprises the following steps of: a. determining whether a maximum power transmission instruction from a base station is received before establishing a phone call; b. determining whether an interrupt signal emitted by a range sensor is received after it is determined that the maximum power transmission instruction from the base station is received, wherein the range sensor emits the interrupt signal when a distance between the mobile phone and a human face is within a predetermined distance range; c. setting a maximum output power of a radio frequency power amplifier (RFPA) to be a first output power when it is determined that the interrupt signal is not received, and setting the maximum output power of the RFPA to be a second output power when it is determined that the interrupt signal is received, wherein the first output power is larger than the second output power; and d. controlling the RFPA to output a radio frequency (RE) signal with the maximum output power.

The step b further comprises: controlling the RFPA to output the RE signal with a power required for a normal phone call after it is determined that the maximum power transmission instruction from the base station is not received.

The predetermined distance range is between 0 and 3 centimeters.

The first output power is 33 dBm, and the second output power is 32 dBm.

The first output power of the RFPA is set to be 33 dBm by setting a DAC parameter of the RFPA to be 580, and the second output power of the RFPA is set to be 32 dBm by setting a DAC parameter of the RFPA to be 560 in the step c.

To solve the aforesaid technical problem, one technical solution of the present disclosure is to provide a mobile phone which comprises: a radio frequency power amplifier (RFPA), being configured to output a radio frequency (RE) signal; a range sensor, being configured to emit an interrupt signal when a distance between the mobile phone and a human face is within a predetermined distance range; and a baseband-signal processing chip connected to the range sensor and the RFPA respectively, being configured to determine whether a maximum power transmission instruction from abuse station is received before establishing a phone call, determine whether the interrupt signal emitted by the range sensor is received after it is determined that the maximum power transmission instruction from the base station is received, out a maximum output power of the RFPA to be a first output power when it is determined that the interrupt signal is not received, set the maximum output power of the RFPA to be a second output power when it is determined that the interrupt signal is received, and control the RFPA to output the RF signal with the maximum output power, wherein the first output power is higher than the second output power.

The baseband-signal processing chip controls the RFPA to output the RF signal with a power required for a normal phone call after it is determined that the maximum power transmission instruction from the base station is not received.

The predetermined distance range is between 0 and 3 centimeters.

The first output power is 33 dBm, and the second output power is 32 dBm.

The baseband-signal processing chip sets the first output power of the RFPA to be 33 dBm by setting a DAC parameter of the RFPA to be 580, and sets the second output power of the RFPA to be 32 dBm by setting a DAC parameter of the RFPA to be 560.

As compared to the prior art, the benefits of the present disclosure are that: the present disclosure determines whether the current test is a SAR test or an antenna radiation power test by determining whether the interrupt signal of the range sensor is received; if the interrupt signal of the range sensor is not received, then the current test is determined as the antenna radiation power test and the RFPA is controlled to output the RF signal with the first output power as the maximum output power to ensure that the mobile phone passes the antenna radiation power test; and if the interrupt signal of the range sensor is received, then the current test is determined as the SAR test, and the RFPA is controlled to output the RF signal with the second output power that is smaller than the first output power as the maximum output power to ensure that the mobile phone passes the SAR test. In this way, the mobile phone can meet the requirements of the SAR test and the antenna radiation power test simultaneously.

DETAILED DESCRIPTION OF THE DISCLOSURE

Figures 1, 2:
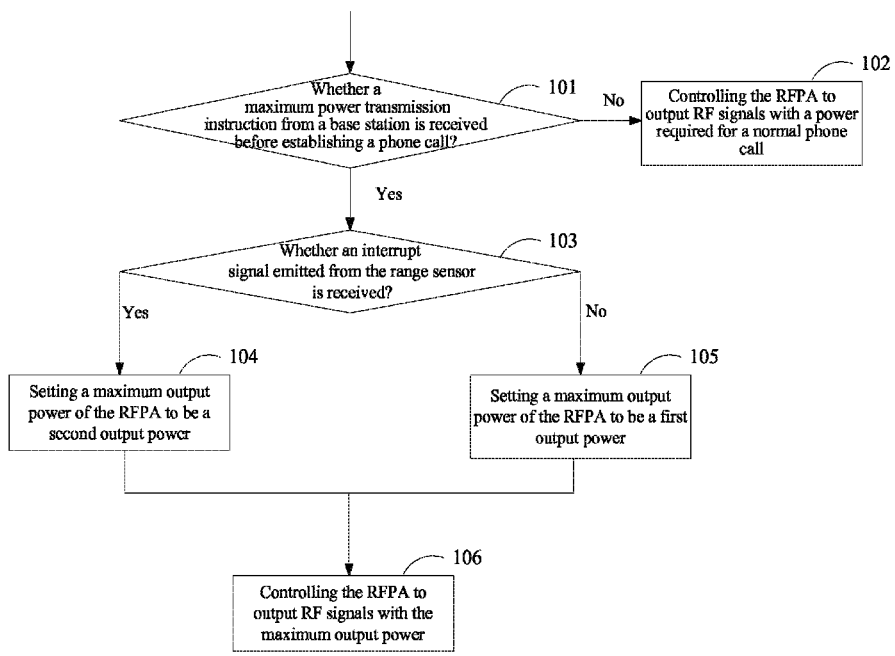
FIG. 1 is a schematic view illustrating the circuit structure of a mobile phone according to a first embodiment of the present disclosure.
FIG. 2 is a flowchart diagram of a method for adjusting the power of the mobile phone according to the first embodiment of the present disclosure.

The present disclosure will be detailed hereinafter with reference to the attached drawings and embodiments.

Referring to FIG. 1 firstly, FIG. 1 is a schematic view for illustrating a circuit structure of a mobile phone according to a first embodiment of the present disclosure. As shown in FIG. 1, the mobile phone of the present disclosure comprises a radio frequency power amplifier (RFPA) 201, a range sensor 202 and a baseband-signal processing chip 203. The baseband-signal processing chip 203 is connected with the RFPA 201 to set a maximum power output value of the RFPA 201; and the baseband-signal processing chip 203 is also connected with the range sensor 202 to obtain a interrupt signal generated by the range sensor 202.

In the present disclosure, two DAC parameters are set by using the baseband-signal processing chip 203 so as to control the maximum output power of the RFPA 201. The DAC parameters are setting parameters of the RFPA 201, and are used to set the maximum output power of the RFPA 201. In the present disclosure, the baseband-signal processing chip 203 sets the maximum output power of the RFPA 201 to be the first output power 33 dBm by setting a DAC parameter of the RFPA 201 to be 580, and sets the maximum output power of the RFPA 201 to be the second output power 32 dBm by setting a DAC parameter of the RFPA 201 to be 560.

During the SAR test, the mobile phone needs to be put close to a human face. Thus, the range sensor 202 is used to detect whether the mobile phone is close to the human face so as to emit an interrupt signal to the baseband-signal processing chip 203 when it is determined that the mobile phone is close to the human face, to make the baseband-signal processing chip 203 set the RFPA 201 to output the RF signal with a smaller maximum output power.

Furthermore, the SAR test and the antenna radiation power test must be performed with the maximum output power of the radio frequency. Thus, during the aforesaid tests, once a phone call is established, the base station will transmit a maximum power transmission instruction to the mobile phone, to instruct the mobile phone to output the RF signal with the maximum output power (i.e., 33±2 dBm). If the maximum power transmission instruction from the base station is not received, it means that the aforesaid tests are not being performed. Then, the baseband-signal processing chip 203 controls the RFPA 201 to output the RF signal with a power required for a normal phone call.

When the baseband-signal processing chip 203 receives the maximum power transmission instruction, the baseband-signal processing chip 203 further determines whether the interrupt signal of the range sensor 202 is received. The mobile phone does not need to be put close to the human face during the antenna radiation power test, so that the current test can be determined as the antenna radiation power test if no interrupt signal is received. Thus, the baseband-signal processing chip 203 adopts the first DAC parameter 580 to control the maximum output power of the RFPA 201 to be the first output power of 33 dBm. In this case, the radiation power of the antenna will reach 28.2 dBm and meet the standard.

When the baseband-signal processing chip 203 receives the interrupt signal of the range sensor 202, the SAR test needs to put the mobile phone close to the human face so that the range sensor 202 can generate the interrupt signal. In this case, it can be determined that the currently performed test is the SAR test. Thus, the second DAC parameter 560 is adopted to control the second output power of the RFPA 201 to be 32 dBm. As a result, during the SAR test, the maximum output power is reduced by 1 dBm because the RFPA 201 adopts the second output power 32 dBm as the maximum output power, and thereby the SAR will be reduced from 1.2 W/Kg to about 0.9 W/Kg and meet the standard.

A method for adjusting the power of the mobile phone of the present disclosure will be described in more detail hereinafter with reference to FIG. 2.

Referring to FIG. 1 and FIG. 2 together, FIG. 2 is a flowchart diagram of the method for adjusting the power of the mobile phone according to the first embodiment of the present disclosure. As shown in FIG. 2, the method for adjusting the power of the mobile phone of the present disclosure comprises following steps of:

Step 101: determining whether a maximum power transmission instruction from a base station is received before establishing a phone call. If the result of the determination is "Yes", step 103 is executed, and otherwise, step 102 is executed.

Step 102: controlling the RFPA 201 to output RF signals with a power required for a normal phone call.

Step 103: determining whether an interrupt signal emitted from the range sensor 202 is received. If the result of the determination is "Yes", step 104 is executed, and otherwise, step 105 is executed. The range sensor 202 emits the interrupt signal when a distance between the mobile phone and a human face is within a predetermined distance range. The predetermined distance can be set on the range sensor 202 according to practical needs, and preferably ranges between 0 and 3 centimeters depending on practical applications.

Step 104: setting the maximum output power of the RFPA 201 to be a second output power.

Step 105: setting the maximum output power of the RFPA 201 to be a first output power, wherein the first output power is larger than the second output power.

Step 106: controlling the RFPA 201 to output the RF signals with the maximum output power.

As mentioned above, the first output power can be set to be 33 dBm, and the second output power can be set to be 32 dBm in the aforesaid step 104 and step 105. The first output power of the RFPA 201 is set to be 33 dBm by setting a DAC parameter of the RFPA 201 to be 580, and the second output power of the RFPA 201 is set to be 32 dBm by setting a DAC parameter of the RFPA 201 to be 560.

All of the aforesaid steps 101 to 106 are executed by the baseband-signal processing chip 203.

It shall be noted that, the aforesaid specific values (e.g., the DAC parameters, the standard value of the antenna radiation power, the first output power, the second output power, the standard value of the electromagnetic wave) can be adjusted according to practical needs. The conception of the present disclosure has been specifically described by merely taking a specific embodiment as an example, so the aforesaid specific values are not limited to what described above without departing from the conception of the present disclosure.

Thus, the present disclosure determines whether the current test is the SAR test or the antenna radiation power test by determining whether the interrupt signal of the range sensor 202 is received. If the interrupt signal of the range sensor 202 is not received, then the current test is determined as the antenna radiation power test, and the RFPA 201 is controlled to output the RF signal with the first output power as the maximum output power to ensure that the mobile phone passes the antenna radiation power test. If the interrupt signal of the range sensor 202 is received, then the current test is determined as the SAR test, and the RFPA 201 is controlled to output the RF signal with the second output power that is smaller than the first output power as the maximum output power to ensure that the mobile phone passes the SAR test. In this way, the mobile phone can meet the requirements of the SAR test and the antenna radiation power test simultaneously.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A method for adjusting a power of a mobile phone, comprising following steps of:
   a. determining whether a maximum power transmission instruction from a base station is received before establishing a phone call, wherein if receiving the maximum power transmission instruction from the base state, it means a specific absorption rate (SAR) test or an antenna radiation power test is to-be performed; and if not receiving the maximum power transmission instruction from the base station, it means none of the SAR test and the antenna radiation power test is to-be performed;
   b. determining whether an interrupt signal emitted from a range sensor is received after it is determined that the maximum power transmission instruction from the base station is received, wherein the range sensor emits the interrupt signal when a distance between the mobile phone and a human face is within a predetermined distance range of 0 to 3 centimeters; and after it is determined that the maximum power transmission instruction from the base station is received, if receiving the interrupt signal emitted from the range sensor, it means the SAR test is to-be performed; and if not receiving the interrupt signal emitted from the range sensor, it means the antenna radiation power test is to-be performed;
   c. setting a maximum output power of a radio frequency power amplifier (RFPA) to be a first output power so as to perform the antenna radiation power test when it is determined that the interrupt signal is not received, and setting the maximum output power of the RFPA to be a second output power so as to perform the SAR test when it is determined that the interrupt signal is received, wherein the first output power is larger than the second output power, the first output power is 33 dBm, and the second output power is 32 dBm; and
   d. controlling the RFPA to output radio frequency (RF) signals with the maximum output power.

2. The method of claim 1, wherein the step b further comprises:
   controlling the RFPA to output the radio frequency signals with a power required for a phone call without performing the SAR test or the antenna radiation power test after it is determined that the maximum power transmission instruction from the base station is not received.

3. A method for adjusting a power of a mobile phone, comprising the following steps of:
   a. determining whether a maximum power transmission instruction from a base station is received before establishing a phone call, wherein if receiving the maximum power transmission instruction from the base state, it means a specific absorption rate (SAR) test or an antenna radiation power test is to-be performed; and if not receiving the maximum power transmission instruction from the base state, it means none of the SAR test and the antenna radiation power test is to-be performed;

b. determining whether an interrupt signal emitted from a range sensor is received after it is determined that the maximum power transmission instruction from the base station is received, wherein the range sensor emits the interrupt signal when a distance between the mobile phone and a human face is within a predetermined distance range; and after it is determined that the maximum power transmission instruction from the base station is received, if receiving the interrupt signal emitted from the range sensor, it means the SAR test is to-be performed; and if not receiving the interrupt signal emitted from the range sensor, it means the antenna radiation power test is to-be performed;

c. setting a maximum output power of a radio frequency power amplifier (RFPA) to be a first output power so as to perform the antenna radiation power test when it is determined that the interrupt signal is not received, and setting the maximum output power of the RFPA to be a second output power so as to perform the SAR test when it is determined that the interrupt signal is received, wherein the first output power is larger than the second output power; and d. controlling the RFPA to output radio frequency (RF) signals with the maximum output power.

4. The method of claim 3, wherein the step b further comprises:

controlling the RFPA to output the radio frequency signals with a power required for a phone call without performing the SAR test or the antenna radiation power test after it is determined that the maximum power transmission instruction from the base station is not received.

5. The method of claim 3, wherein the predetermined distance range is between 0 and 3 centimeters.

6. The method of claim 3, wherein the first output power is 33 dBm, and the second output power is 32 dBm.

7. The method of claim 6, wherein the first output power of the RFPA is set to be 33 dBm by setting a digital to analog converter (DAC) parameter of the RFPA to be 580, and the second output power of the RFPA is set to be 32 dBm by setting a DAC parameter of the RFPA to be 560 in the step c.

8. A power-adjustable mobile phone, comprising:
a radio frequency power amplifier (RFPA), being configured to output a radio frequency (RF) signal;
a range sensor, being configured to emit an interrupt signal when a distance between the mobile phone and a human face is within a predetermined distance range; and
a baseband-signal processing chip connected to the range sensor and the RFPA respectively, wherein the baseband-signal processing chip is configured to determine whether a maximum power transmission instruction from a base station is received before establishing a phone call, wherein if receiving the maximum power transmission instruction from the base station, it means a specific absorption rate (SAR) test or an antenna radiation power test is to-be performed; and if not receiving the maximum power transmission instruction from the base station, it means none of the SAR test and the antenna radiation power test is to-be performed; the baseband-signal processing chip is further configured to determine whether an interrupt signal emitted from the range sensor is received after it is determined that the maximum power transmission instruction from the base station is received, wherein if receiving the interrupt signal emitted from the range sensor, it means the SAR test is to-be performed; and if not receiving the interrupt signal emitted from the range sensor, it means the antenna radiation power test is to-be performed; the baseband-signal processing chip is further configured to set a maximum output power of the RFPA to be a first output power so as to perform the antenna radiation power test when it is determined that the interrupt signal is not received, set the maximum output power of the RFPA to be a second output power so as to perform the SAR test when it is determined that the interrupt signal is received, and the baseband-signal processing chip is further configured to control the RFPA to output RF signals with the maximum output power, wherein the first output power is higher than the second output power.

9. The mobile phone of claim 8, wherein the baseband-signal processing chip controls the RFPA to output the RF signals with a power required for a phone call without performing the SAR test or the antenna radiation power test after it is determined that the maximum power transmission instruction from the base station is not received.

10. The mobile phone of claim 8, wherein the predetermined distance range is between 0 and 3 centimeters.

11. The mobile phone of claim 8, wherein the first output power is 33 dBm, and the second output power is 32 dBm.

12. The mobile phone of claim 11, wherein the baseband-signal processing chip sets the first output power of the RFPA to be 33 dBm by setting a digital to analog converter (DAC) parameter of the RFPA to be 580, and sets the second output power of the RFPA to be 32 dBm by setting a DAC parameter of the RFPA to be 560.

* * * * *